(12) United States Patent
Takahashi

(10) Patent No.: US 11,656,698 B1
(45) Date of Patent: May 23, 2023

(54) TOUCH SENSOR AND INPUT DEVICE

(71) Applicant: NISSHA CO., LTD., Kyoto (JP)

(72) Inventor: Michiya Takahashi, Kyoto (JP)

(73) Assignee: NISSHA CO., LTD., Kyoto (JP)

( * ) Notice: Subject to any disclaimer, the term of this patent is extended or adjusted under 35 U.S.C. 154(b) by 0 days.

(21) Appl. No.: 17/927,147

(22) PCT Filed: May 18, 2021

(86) PCT No.: PCT/JP2021/018736
§ 371 (c)(1),
(2) Date: Nov. 22, 2022

(87) PCT Pub. No.: WO2021/241314
PCT Pub. Date: Dec. 2, 2021

(30) Foreign Application Priority Data

May 28, 2020 (JP) .............................. JP2020-093586

(51) Int. Cl.
*G06F 3/041* (2006.01)
*B32B 7/12* (2006.01)
(Continued)

(52) U.S. Cl.
CPC .............. *G06F 3/041* (2013.01); *B32B 7/022* (2019.01); *B32B 7/12* (2013.01); *B32B 27/08* (2013.01);
(Continued)

(58) Field of Classification Search
CPC ........... G06F 3/041; B32B 7/022; B32B 7/12; B32B 27/08; B32B 27/308; B32B 27/325; B32B 27/40; B32B 27/42; B32B 17/10; B32B 2307/412; B32B 2307/414; B32B 2457/208
See application file for complete search history.

(56) References Cited

U.S. PATENT DOCUMENTS 10,618,253 B1 * 4/2020 Menon ................. B32B 37/144
11,119,597 B2 * 9/2021 Yu ....................... G02F 1/13338
(Continued)

FOREIGN PATENT DOCUMENTS

JP 2006201226 A 8/2006
JP 2007268996 A 10/2007
(Continued)

*Primary Examiner* — Grant Sitta
(74) *Attorney, Agent, or Firm* — Alleman Hall Creasman & Tuttle LLP

(57) ABSTRACT

To suppress cracks generated by a change in environmental temperature in a sensor body of a touch sensor that includes a light-transmissive resin film substantially made of a cycloolefin-based resin. A liquid optically clear adhesive layer is an adhesive layer including a cured body of an adhesive adhering to a glass plate that is a solid member. A sensor body having a film shape firmly adheres to the glass plate by the liquid optically clear adhesive layer, and detects a position of a contact point on a display area. A light-transmissive resin film of the sensor body is substantially made of a cycloolefin-based resin. A buffer layer having viscoelasticity at 25° C. is provided between the light-transmissive resin film and the liquid optically clear adhesive layer to relieve stress transferred from the liquid optically clear adhesive layer to the light-transmissive resin film.

6 Claims, 8 Drawing Sheets

(51) Int. Cl.
    *B32B 27/32* (2006.01)
    *B32B 27/30* (2006.01)
    *B32B 27/40* (2006.01)
    *B32B 7/022* (2019.01)
    *B32B 27/08* (2006.01)
    *B32B 27/42* (2006.01)
    *B32B 17/10* (2006.01)

(52) U.S. Cl.
    CPC .......... *B32B 27/308* (2013.01); *B32B 27/325* (2013.01); *B32B 27/40* (2013.01); *B32B 27/42* (2013.01); *B32B 17/10* (2013.01); *B32B 2307/412* (2013.01); *B32B 2307/414* (2013.01); *B32B 2457/208* (2013.01)

(56) References Cited

U.S. PATENT DOCUMENTS

| | | | |
|---|---|---|---|
| 11,426,982 B2 * | 8/2022 | Fukada | B32B 17/10807 |
| 11,526,222 B2 * | 12/2022 | Li | G06F 1/1641 |
| 2015/0004382 A1 * | 1/2015 | Menon | G02F 1/133509 156/60 |
| 2017/0147117 A1 | 5/2017 | Song et al. | |
| 2018/0082669 A1 * | 3/2018 | Lu | B32B 17/1055 |
| 2019/0204661 A1 * | 7/2019 | Moon | H05K 5/0017 |
| 2019/0300425 A1 * | 10/2019 | Ikadai | B32B 27/32 |
| 2019/0346956 A1 * | 11/2019 | Steinmark | G06F 1/1626 |
| 2020/0108587 A1 * | 4/2020 | Han | B32B 27/365 |
| 2021/0365131 A1 * | 11/2021 | Zhou | G06F 1/1637 |
| 2021/0403765 A1 * | 12/2021 | Hashimoto | H01L 24/96 |
| 2022/0112406 A1 * | 4/2022 | Kamio | B32B 27/08 |

FOREIGN PATENT DOCUMENTS

| | | |
|---|---|---|
| JP | 2008001760 A | 1/2008 |
| JP | 2015041130 A | 3/2015 |
| JP | 2019003653 A | 1/2019 |
| JP | 2019529603 A | 10/2019 |
| WO | 2015029350 A1 | 3/2015 |
| WO | 2018092657 A1 | 5/2018 |
| WO | 2018168402 A1 | 9/2018 |
| WO | 2019044155 A1 | 3/2019 |

\* cited by examiner

TOUCH SENSOR AND INPUT DEVICE

TECHNICAL FIELD

The present invention relates to a touch sensor and an input device including the touch sensor.

BACKGROUND ART

Conventionally, a touch panel has been known as an input device through which information is input with a person touching the touch panel with a finger or the like. Of touch panels, for example, touch panels including a liquid crystal display (which may be referred to as an LCD below) often employ an air gap structure, and the structure in which a gap is provided between a touch sensor and an LCD has been mainstream. However, in recent years, there has been a demand for reducing reflection, improving visibility with bright light, and increasing the resolution of an LCD in a touch panel. In order to satisfy such a demand, a structure may be adopted in which a touch sensor, a liquid optically clear adhesive (LOCA), and an LCD are layered without gaps, with the LOCA between the touch sensor and the LCD. For example, in Patent Document 1 (JP 3880418 B), a transparent adhesive layer is provided over the entire surface between a touch sensor and a display device to improve visibility.

CITATION LIST

PATENT LITERATURE

Patent Document 1: JP 3880418 B

SUMMARY OF INVENTION

TECHNICAL PROBLEM

The touch sensor of a touch panel of Patent Document 1 includes a sensor body having a film-like shape. The sensor body having a film-like shape is a member including a transparent resin film and a transparent electrode for detecting a position of a contact point on a display area. An LOCA is used to cause the resin film to adhere to an LCD. However, since linear expansion coefficients of the LOCA layer and the sensor body are different from each other, due to a change in temperature around the touch sensor, force is applied to the sensor body having a film-like shape from the transparent adhesive layer.

Various materials are used in resin films included in sensor bodies. Some resin films included in sensor bodies are relatively susceptible to cracks. It has been recently confirmed that when the material of the resin film included in the sensor body is a cycloolefin-based resin, a crack may occur in the resin film due to a change in environmental temperature of the touch sensor. When a crack is generated in the resin film in this way, the touch sensor and the touch panel do not operate normally.

An object of the present invention is to suppress, in a touch sensor and an input device, cracks generated by a change in environmental temperature in a sensor body including a light-transmissive resin film made of a cycloolefin-based resin.

SOLUTION TO PROBLEM

Some aspects will be described below as means to solve the problems. These aspects can be combined randomly as necessary.

A touch sensor according to an aspect of the present invention includes a solid member, an adhesive layer, and a sensor body having a film-like shape. The adhesive layer includes a cured body of an adhesive adhering to the solid member and having a curing compressibility ratio of 1% or greater. The sensor body having a film-like shape firmly adheres to the solid member by the adhesive layer and detects a position of a contact point on a display area. The sensor body includes a light-transmissive resin film substantially made of a cycloolefin-based resin and having a linear expansion coefficient less than that of the cured body, and a buffer layer provided between the light-transmissive resin film and the adhesive layer to relieve stress transferred from the adhesive layer to the light-transmissive resin film. The buffer layer has viscoelasticity at 25° C.

In the touch sensor configured in this way, the cured body of the adhesive adhering to the solid member also adheres to the light-transmissive resin film. The residual stress by the cured body of the adhesive having a curing compressibility ratio of 1% or greater and the force exerted from the cured body of the adhesive to the light-transmissive resin film due to a change in environmental temperature are relieved by the buffer layer, making it possible to suppress the occurrence of cracks in the light-transmissive resin film made of a cycloolefin-based resin.

In the aforementioned touch sensor, the solid member may have translucency, and the adhesive layer may be a liquid optically clear adhesive layer including a cured body of a liquid optically clear adhesive that has a linear expansion coefficient greater than that of the light-transmissive resin film and a curing compressibility ratio of 1% or greater. The touch sensor configured in this way is excellent in transparency and visibility.

The buffer layer of the aforementioned touch sensor is preferably configured to have, at 25° C., a Young's modulus greater than that of the adhesive layer and less than that of the light-transmissive resin film. The touch sensor configured in this way can effectively decrease stress generated in the cured body of the adhesive and transferred to the light-transmissive resin film.

The aforementioned touch sensor may include, as a buffer layer, a buffer layer substantially made of a light-transmissive acrylic adhesive. According to the touch sensor configured in this way, the touch sensor that is optically excellent and in which cracks of the light-transmissive resin film are suppressed can be easily realized by the buffer layer made of the acrylic adhesive.

The aforementioned touch sensor may be configured such that the material of the buffer layer is substantially a light-transmissive acrylic adhesive and contains a urethane, a polyfunctional acrylate, an isocyanate, and a bisphenol. In the touch sensor configured in this way, adhesion and strength of the buffer layer are improved by cross-linking, and sufficient buffering performance can be easily obtained.

An input device according to an aspect of the present invention includes a solid member and a touch sensor adhering to the solid member. The touch sensor includes an adhesive layer adhering to the solid member and including a cured body of an adhesive having a curing compressibility ratio of 1% or greater, and a sensor body having a film-like shape and firmly adhering to the solid member by the adhesive layer. The sensor body includes a light-transmissive resin film substantially made of a cycloolefin-based resin and having a linear expansion coefficient less than that of the cured body, and a buffer layer provided between the light-transmissive resin film and the adhesive layer to relieve stress transferred from the adhesive layer to the light-transmissive resin film. The buffer layer has viscoelasticity at 25° C.

In the touch panel configured in this way, the cured body of the adhesive adhering to the solid member also adheres to the light-transmissive resin film. The residual stress by the cured body of the adhesive having a curing compressibility ratio of 1% or greater and the force exerted from the cured body of the adhesive to the light-transmissive resin film due to a change in environmental temperature are relieved by the buffer layer, making it possible to suppress the occurrence of cracks in the light-transmissive resin film made of a cycloolefin-based resin.

ADVANTAGEOUS EFFECTS OF INVENTION

In the touch sensor and the touch panel according to the present invention, the buffer layer can suppress cracks generated by a change in environmental temperature in the sensor body including the light-transmissive resin film substantially made of a cycloolefin-based resin.

DESCRIPTION OF EMBODIMENTS

First Embodiment (1) Overall Configuration

Figure 1:
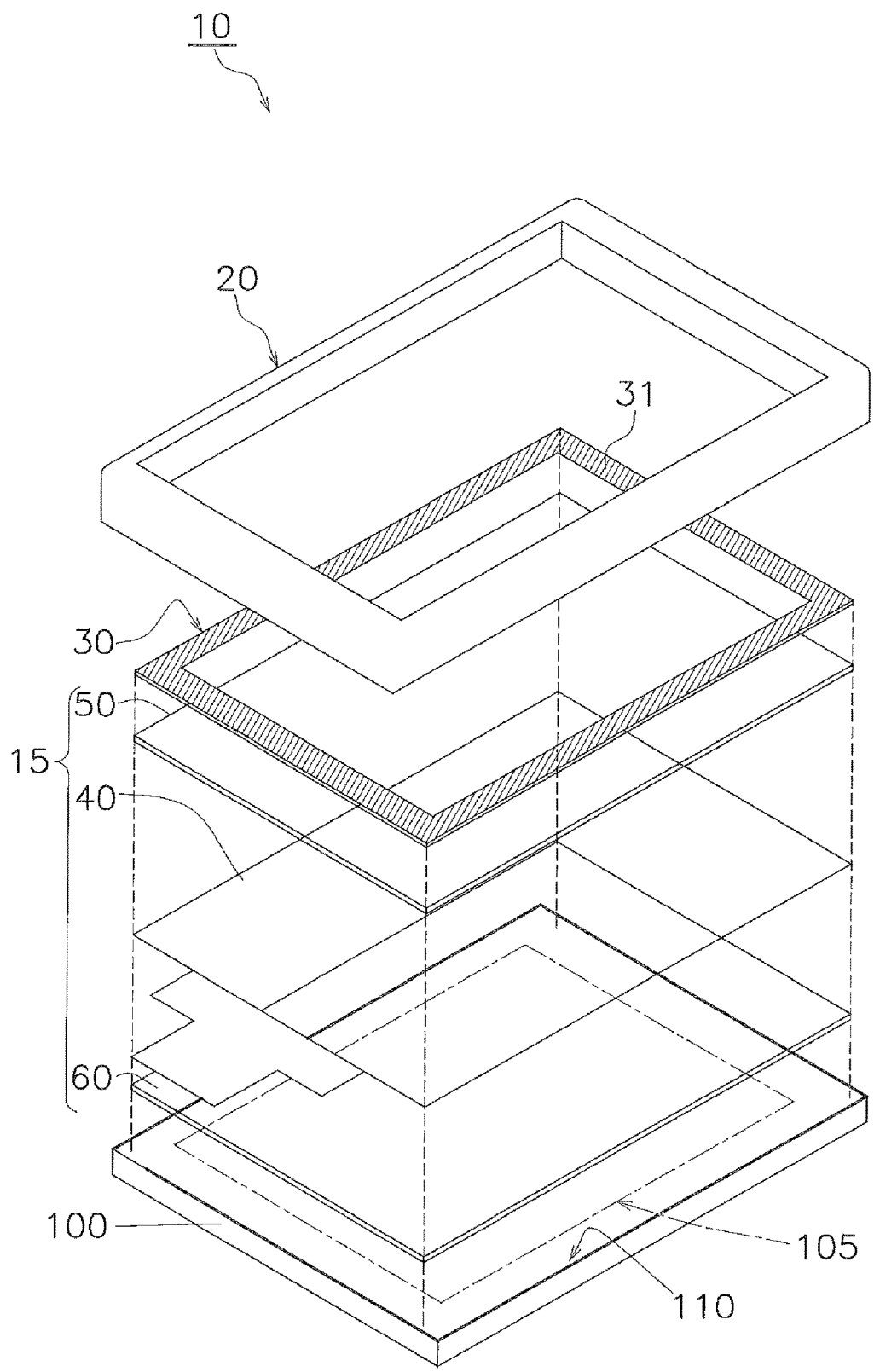
FIG. 1 is an exploded perspective view illustrating an example of the configuration of a touch panel according to a first embodiment.

FIG. 1 illustrates an example of the configuration of a touch panel 10 according to a first embodiment. The touch panel 10 is an example of an input device. In FIG. 1, the touch panel 10 is illustrated exploded into a touch sensor 15, a frame 20, a cover glass 30, and a display panel 100. The touch sensor 15 includes a sensor body 40 and liquid optically clear adhesive layers 50, 60. Liquid optically clear adhesive (LOCA) is a liquid-based adhesive for bonding optical materials. The LOCA is, for example, a gel-like optically clear adhesive (OCA), and is a material that changes into a rubbery material by curing.

The display panel 100 includes, for example, a rectangular screen 105. Here, a case where the screen 105 is rectangular will be described; however, the screen 105 only needs to have a predetermined shape and is not limited to rectangular ones. The display panel 100 includes, for example, a glass plate 110 on the surface in order to protect the screen 105. The glass plate 110 is a solid member. The glass plate 110 that is a solid member is a member that does not substantially change its shape in response to stress applied from the LOCA. Consequently, even when stress is generated in the LOCA, the glass plate 110 that is a solid member has no function to relieve the stress. Here, a case where the solid member is the glass plate 110 will be described; however, the light-transmissive solid member of the display panel 100 is not limited to the glass plate 110. The solid member may be, for example, a filter of a liquid crystal panel when the display panel is a liquid crystal display panel, or may be a glass substrate when the display panel is an electroluminescence panel.

The cover glass 30 is a flat and thin glass member covering the entire surface of the touch sensor 15. An annular shielding layer 31 is formed at an edge portion of the cover glass 30. The shielding layer 31 has a function to block excessive light leaking from the screen 105. The area of a rectangle surrounded by the shielding layer 31 is approximately equal to the size of the screen 105. The LOCA layer 50 has an area greater than that of the rectangle surrounded by the shielding layer 31.

The LOCA layers 50, 60 are each a layer including a cured body of a liquid optically clear adhesive. The LOCA layers 50, 60 are each, for example, a layer made of a cured body only of a liquid optically clear adhesive. The LOCA layers 50, 60 each have a substantially uniform thickness, for example, when the cover glass 30, the glass plate 110, and the sensor body 40 are flat. The shapes of the LOCA layers 50, 60 are each a rectangle having a size substantially the same as or greater than that of the screen 105. The screen 105 is a display area. The LOCA layers 50, 60 each have an area substantially the same as or greater than that of the display area.

The LOCA shrinks as it cures. The curing compressibility ratio of the LOCA used herein is 1% or greater. The curing compressibility ratio is defined as a shrinkage ratio of a length after curing to a length before curing in a predetermined direction in a planar direction in which the LOCA layer extends. For example, in accordance with JIS K 5600, densities before and after curing are measured, and the curing compressibility ratio is obtained from changes in density. A curing compressibility ratio r is obtained from Equation (1) below, where the specific gravity of the liquid before curing is dl and the specific gravity of the solid after curing is ds. The specific gravity dl of the liquid is measured by a pycnometer method. The specific gravity ds of the solid is measured by a solid specific gravity measurement method.

$$r=\{(ds^{1/3}-dl^{1/3})/dl^{1/3}\}\times 100 \ldots (1)$$

Alternatively, when it is difficult to perform such measurements, for example, in accordance with JIS K 6911, a bar-shaped cast molding of 20 cm×1 cm×1 cm is cured, a shrinkage ratio in the longitudinal direction is measured, and the shrinkage ratio is taken as the curing compressibility ratio.

Figure 2:
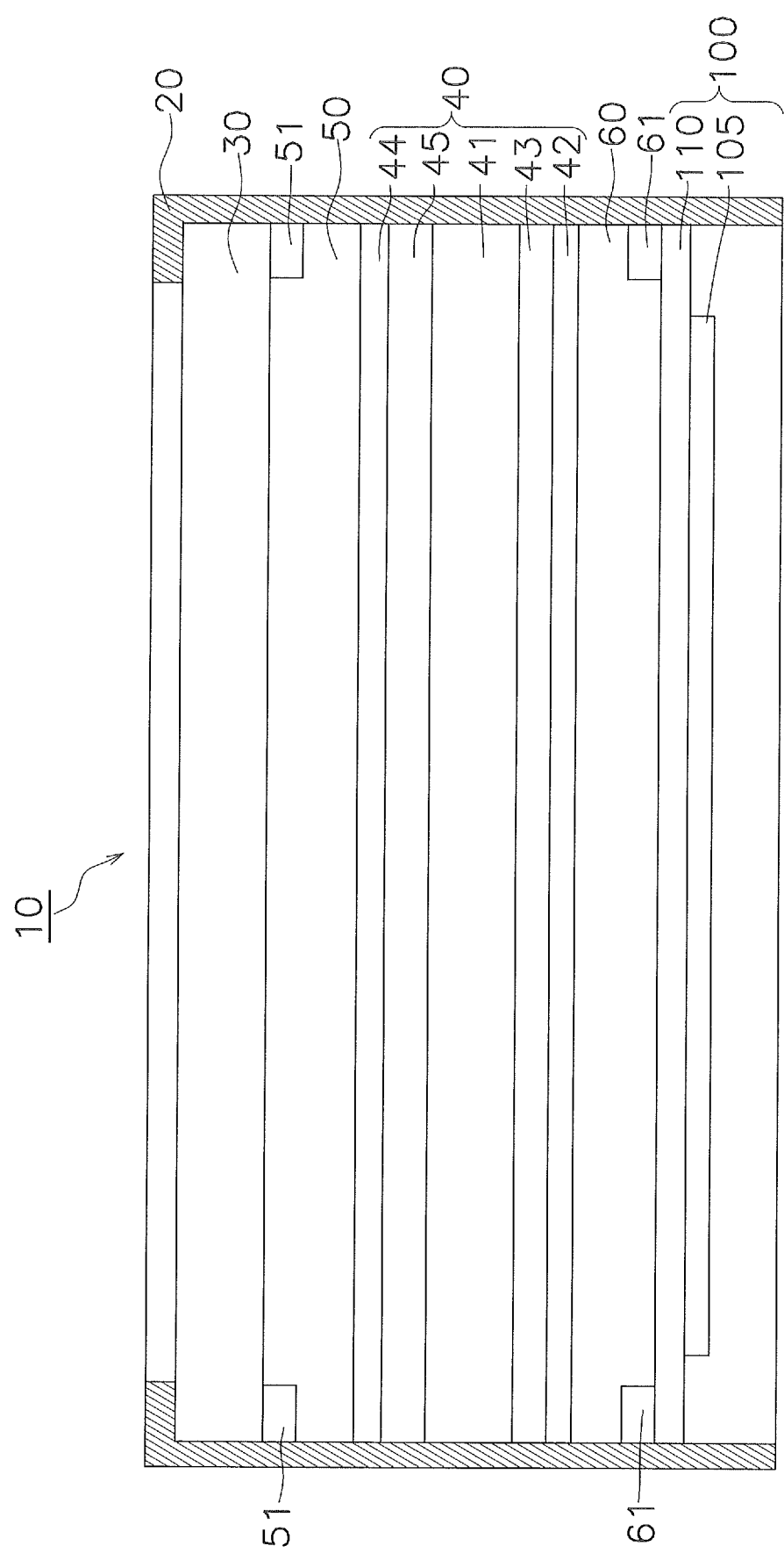
FIG. 2 is a schematic cross-sectional view of the touch panel for illustrating the configuration of the touch panel of FIG. 1.

FIG. 2 schematically illustrates the outline of a layered structure of the touch panel 10 according to the first embodiment. While it is illustrated enlarged in the thickness direction in a deformed manner for improved visualization in FIG. 2, the sensor body 40 has a film-like shape. The sensor body 40 firmly adheres to the glass plate 110 by the LOCA layer 60.

The sensor body 40 detects a position of a contact point at which a detection target comes into contact with the touch panel 10. The sensor body 40 detects at which position a detection target such as a finger coming into contact with the touch panel 10 is located relative to the sensor body 40. Since a user of the touch panel 10 usually touches the touch panel 10, the position is referred to as a contact point here. In the first embodiment, since the sensor body 40 is covered by the cover glass 30, no detection target such as a finger comes into direct contact with the sensor body 40. The sensor body 40 may be configured to detect a position of the detection target on the display area when the detection target is proximate to the touch panel 10 without being in contact therewith. Here, the expression "the sensor body 40 detects a position of a contact point on the display area" encompasses such proximity points.

The sensor body 40 includes a light-transmissive resin film 41 substantially made of a cycloolefin-based resin, and a buffer layer 42.

The light-transmissive resin film 41 has a linear expansion coefficient less than that of a cured body of LOCA. The linear expansion coefficient is measured with a thermomechanical analyzer (TMA) in accordance with JIS K 7197. Here, a temperature T1 on the low temperature side is set to -40° C., and a temperature T2 on the high temperature side is set to 100° C.

The buffer layer 42 is a layer provided between the light-transmissive resin film 41 and the LOCA layer 60 to relieve stress transferred from the LOCA layer 60 to the light-transmissive resin film 41. In order to relieve such stress, the buffer layer 42 has translucency and, at least at 25° C., viscoelasticity. Here, a case where the buffer layer 42 is disposed with an other layer 43 or a plurality of other layers 43 interposed between the light-transmissive resin film 41 and the buffer layer 42 is illustrated. However, the buffer layer 42 may be disposed in direct contact with the light-transmissive resin film 41 and the LOCA layer 60. For example, the buffer layer 42 is disposed with a transparent electrode layer as the other layer 43 interposed between the light-transmissive resin film 41 and the buffer layer 42. In addition, for example, the buffer layer 42 is disposed with a passivation layer as the other layer 43 interposed between the light-transmissive resin film 41 and the buffer layer 42. Examples of the passivation layer include a rustproof layer and a protective layer.

In the first embodiment, the sensor body 40 firmly adheres to the cover glass 30 by the LOCA layer 50. The sensor body 40 includes a buffer layer 44 provided between the light-transmissive resin film 41 and the LOCA layer 50. The buffer layer 44 is a layer provided between the light-transmissive resin film 41 and the LOCA layer 50 to relieve stress transferred from the LOCA layer 50 to the light-transmissive resin film 41. In order to relieve such stress, the buffer layer 44 has translucency and, at least at 25° C., viscoelasticity. Here, a case where the buffer layer 44 is disposed with an other layer 45 or a plurality of other layers 45 interposed between the light-transmissive resin film 41 and the buffer layer 44 is illustrated. However, the buffer layer 44 may be disposed in direct contact with the light-transmissive resin film 41 and the LOCA layer 50. For example, the buffer layer 44 is disposed with a transparent electrode layer as the other layer 45 interposed between the light-transmissive resin film 41 and the buffer layer 44. In addition, for example, the buffer layer 44 is disposed with a passivation layer as the other layer 45 interposed between the light-transmissive resin film 41 and the buffer layer 44. Examples of the passivation layer include a rustproof layer and a protective layer.

The LOCA layers 50, 60 are layers formed such that a gap between the sensor body 40 and the cover glass 30 is filled with the LOCA without bubbles or gaps and a gap between the sensor body 40 and the glass plate 110 is filled with the LOCA without bubbles or gaps, respectively.

(2) Detailed Configuration
(2-1) LOCA Layers 50, 60

The thickness of the LOCA layers 50, 60 is, for example, from 1 mm to 10 mm. In addition, the size of the LOCA layers 50, 60 is, for example, from 60 $cm^2$ to 400 $cm^2$. When forming the LOCA layers 50, 60, for example, dams 51, 61 are formed at edge portions of the cover glass 30 and the glass plate 110, respectively, so that the LOCA does not protrude to the outside of the cover glass 30 and the glass plate 110. For example, an acrylic LOCA or a silicone LOCA can be used as the LOCA. Examples of the LOCA include Loctaite (trade name) manufactured by Henkel Japan Ltd., LOCA manufactured by 3M Company, and LOCA manufactured by Momentive Inc. Examples of methods of curing the LOCA (curing methods) include a method of applying ultraviolet rays, a method of applying ultraviolet rays and heat, and a method of applying ultraviolet rays and moisture. The LOCA layers 50, 60 are stuck to the cover glass 30 and the glass plate 110, respectively, before being cured.

(2-2) Sensor Body 40
(2-2-1) Light-transmissive Resin Film 41

The thickness of the light-transmissive resin film 41 is, for example, selected from the range from 10 μm to 500 μm. Examples of transparent cycloolefin-based resins include cycloolefin polymers (COP) and cycloolefin copolymers (COC). The light-transmissive resin film 41 only needs to be a light-transmissive resin film substantially made of a cycloolefin-based resin. Here, the "light-transmissive resin film substantially made of a cycloolefin-based resin" means that a material other than the cycloolefin-based resin may be contained to the extent that the mechanical properties of the light-transmissive resin film are substantially the same as the mechanical properties of the cycloolefin-based resin. The "light-transmissive resin film substantially made of a cycloolefin-based resin" includes, for example, light-transmissive resin films in which the content of the cycloolefin-based resin is 90 mass% or greater of the entire light-transmissive resin film. Examples of cycloolefin-based resins include ZEONEX (trade name) manufactured by Zeon Corporation, ZEONOR (trade name) manufactured by Zeon Corporation, ARTON (trade name) manufactured by JSR Corporation, TOPAS (trade name) manufactured by Polyplastics Co., Ltd., and APEL (trade name) manufactured by Mitsui Chemicals, Inc. The light-transmissive resin film formed by using any of these commercially available resins is a light-transmissive resin film substantially made of a cycloolefin-based resin.

(2-2-2) Buffer Layers 42, 44

The thickness of the buffer layers 42, 44 is, for example, from 10 μm to 300 μm. The thickness of the buffer layers 42, 44 is preferably from 30 μm to 200 μm. When the buffer layers 42, 44 are too thin, a sufficient buffer effect cannot be obtained. When the buffer layers 42, 44 are too thick, optical properties deteriorate. The buffer layers 42, 44 are substantially made of a light-transmissive acrylic adhesive. Here, "substantially made of an acrylic adhesive" means that the buffer layers 42, 44 may contain a material other than the acrylic adhesive to the extent that the optical properties and mechanical properties of the buffer layers 42, 44 are substantially the same as the optical properties and mechanical properties of the acrylic adhesive. For example, "substantially made of an acrylic adhesive" encompasses buffer layers in which the content of the acrylic adhesive is 90 mass% or greater of the entire buffer layer.

In addition, such an acrylic adhesive preferably contains a urethane, a polyfunctional acrylate, an isocyanate, and a bisphenol. When the acrylic adhesive contains the aforementioned materials, adhesion and strength are improved by cross-linking as compared with a case where the acrylic adhesive does not contain the aforementioned materials.

In order to reduce environmental loads, the reactive acid component of the buffer layers 42, 44 is preferably not eliminated by ultraviolet rays.

The peel strength of the buffer layers 42, 44 is preferably from 15 to 20 N/25 mm at 25° C. In addition, the peel strength of the buffer layers 42, 44 is preferably from 5 to 10 N/25 mm at 95° C. The peel strength is measured in accordance with JISC6481 (1996) by peeling the buffer layers 42, 44 perpendicularly to the light-transmissive resin film 41 at a rate of 50 mm/min.

Figure 3:
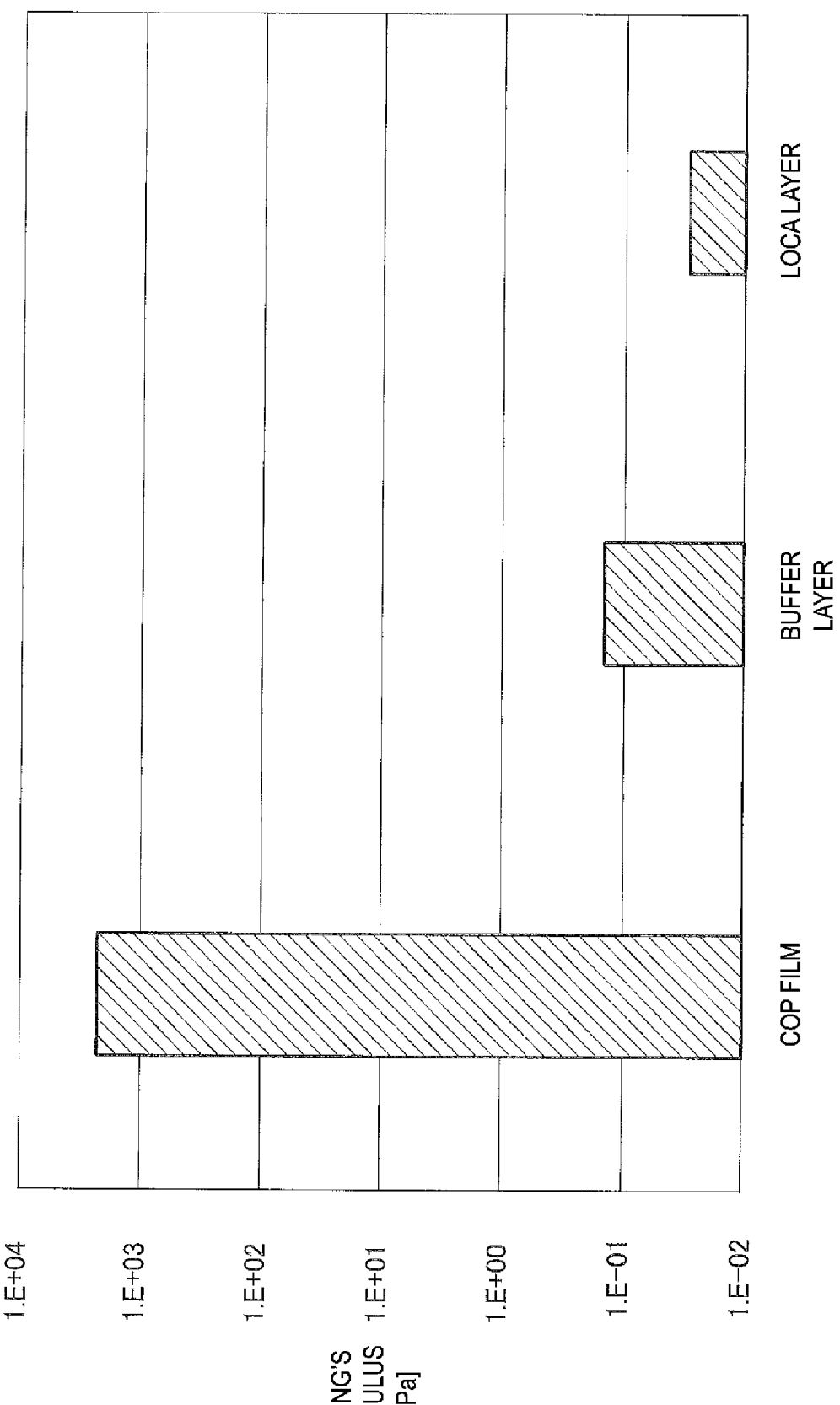
FIG. 3 is a graph for showing the difference among Young's moduli of a light-transmissive resin film, a buffer layer, and an optically clear adhesive layer.

FIG. 3 illustrates the relationship among a Young's modulus of the light-transmissive resin film 41 (COP film), a Young's modulus of the buffer layers 42, 44, and a Young's modulus of the LOCA layers 50, 60 at 25° C. As illustrated in FIG. 3, the buffer layers 42, 44 of the touch sensor 15 are configured to have, at 25° C., a Young's modulus greater than that of the LOCA layers 50, 60 formed of a cured body of the LOCA and less than that of the light-transmissive resin film 41. The Young's modulus of the buffer layers 42, 44 is preferably from 0.15 to 0.25 MPa at 25° C. The Young's modulus of the buffer layers 42, 44 is preferably from 0.15 to 0.25 MPa at 95° C. The Young's modulus is measured in accordance with JIS K 7127. The tension rate at the time of measuring the Young's modulus is 500 mm/min.

When the touch sensor 15 is of a capacitive type, the relative permittivity of the buffer layers 42, 44 is preferably from 3 to 4 in a measurement environment of from -20° C. to 85° C. and at a measurement frequency of from 1 kHz to 1 MHz. The relative permittivity is measured in accordance with JIS C 2138.

In a reliability test, the total light transmittance is preferably from 88.5% to 90%. The reliability test is performed at -40° C., 100° C., and 65° C. and 93% RH each for 1,000 hours.

(2-2-3) Other Layers 43, 45

At the light-transmissive resin film 41, for example, transparent electrodes (not illustrated) are formed as other layers 43, 45. The thickness of the transparent electrode is, for example, from 0.05 μm to 0.1 μm. Of the two surfaces of the light-transmissive resin film 41, the transparent electrode may be formed on the cover glass 30 side, may be formed on the display panel 100 side, or may be formed on both of the sides. The transparent electrode is formed of, for example, a metal oxide, a transparent conductive polymer, or transparent conductive ink. Examples of metal oxides include indium tin oxide (ITO) and indium zinc oxide (IZO). An example of a transparent conductive polymer is poly-3, 4-ethylenedioxythiophene/polysulfonic acid (PEDOT/PSS). In addition, examples of transparent conductive ink include ink containing carbon nanotubes or silver nanofibers in a binder.

Passivation layers may be provided as other layers 43, 45 between the light-transmissive resin film 41 and the buffer layer 42. Such passivation layers are provided each covering a transparent electrode, and are formed of, for example, an insulating resin. The passivation layers can be formed of, for example, an ultraviolet photosensitive resin, and have a thickness of from 1 μm to 20 μm.

(3) Features (3-1)

Figure 4:
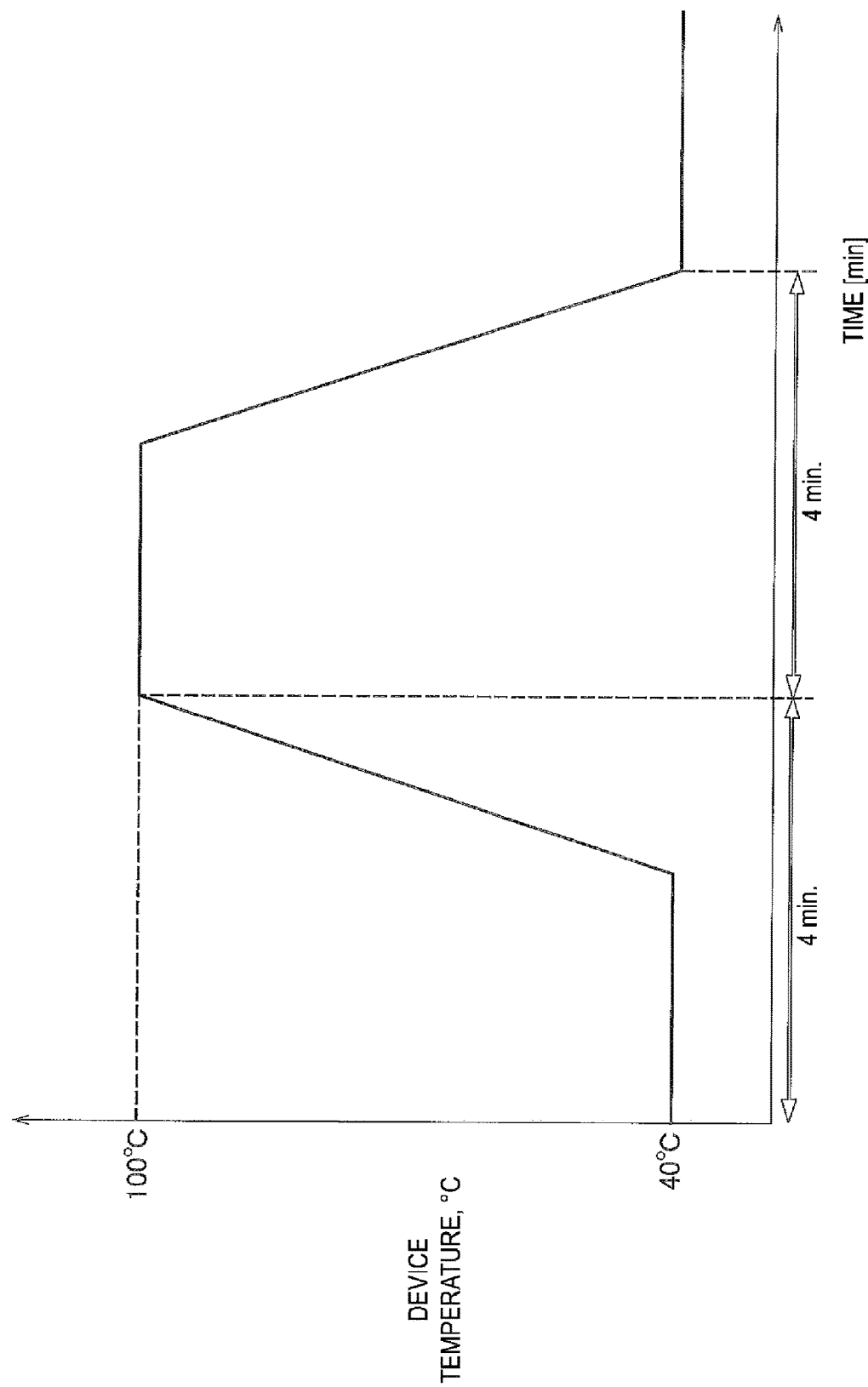
FIG. 4 is a graph for showing conditions of a thermal shock test.

As shown in the graph of FIG. 4, the influence of the force exerted from the liquid optically clear adhesive layer to the light-transmissive resin film due to a change in environmental temperature was evaluated by a thermal shock test, in which a first state of exposure to air at -40° C. for four minutes and a second state of exposure to air at 100° C. for four minutes were alternately repeated.

Samples obtained by curing and causing to adhere, by a LOCA layer having a thickness of 1 mm, a light-transmissive resin film having a thickness of 100 μm and an area of 100 cm$^2$ and made of a cycloolefin-based resin to a glass plate, and samples in which a buffer layer having a thickness of 100 μm was disposed between the same LOCA layer and the same light-transmissive resin film were compared.

Figure 5:
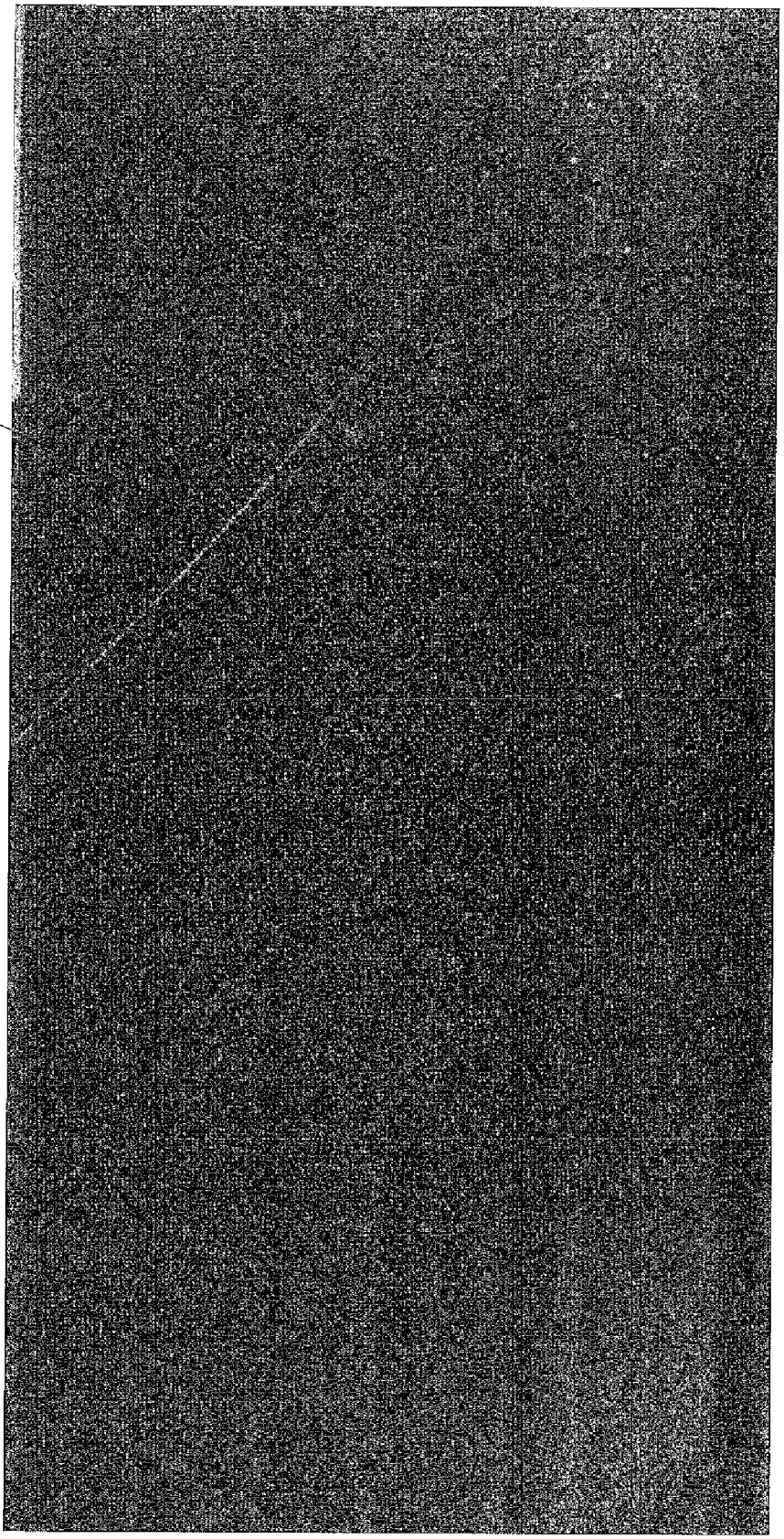
FIG. 5 is a drawing-substitutive picture illustrating an example of cracks generated in the light-transmissive resin film.

After 167 cycles, a sample in which a crack developed in the light-transmissive resin film was found in the former, but no sample in which a crack developed was found in the latter. FIG. 5 illustrates a crack 200 in the light-transmissive resin film of the former generated in the experiment.

Figure 6:
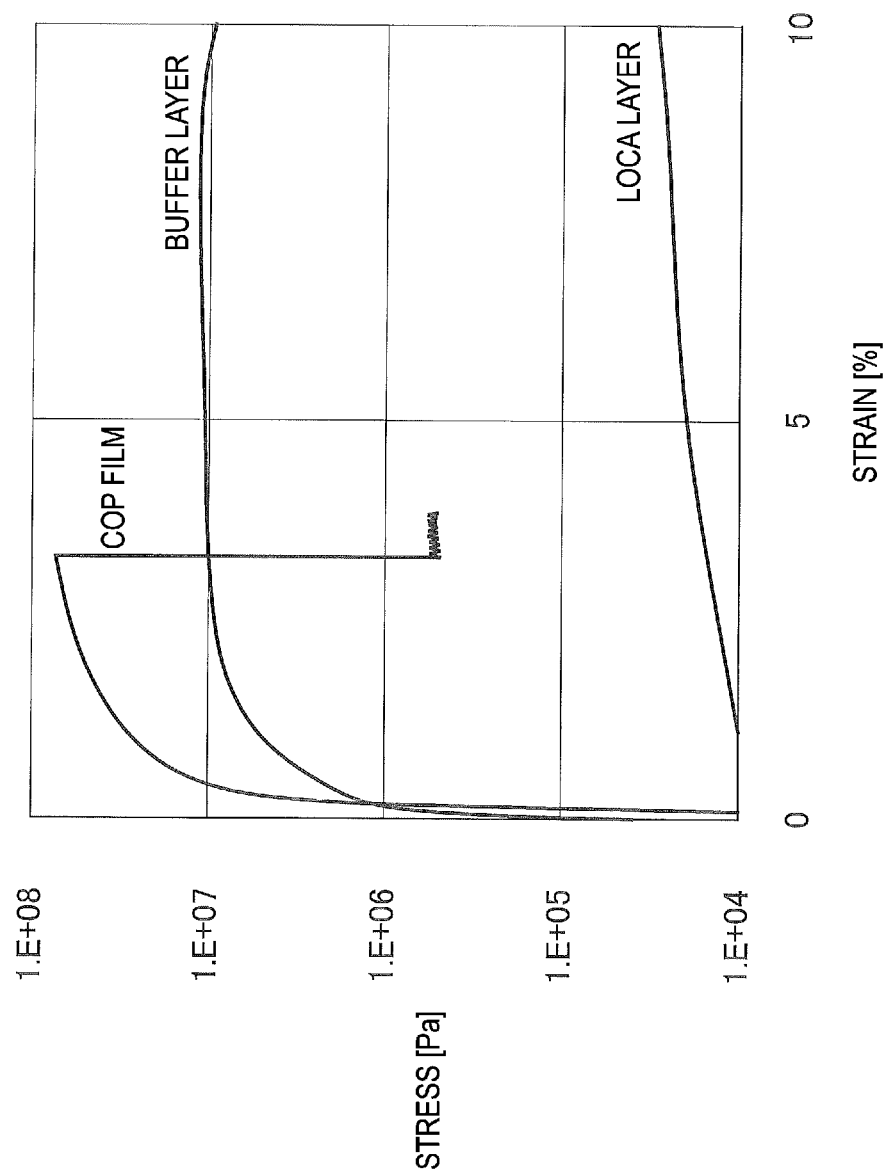
FIG. 6 is a graph showing an example of the relationship among stress and strain of the light-transmissive resin film, the buffer layer, and the optically clear adhesive layer.

FIG. 6 illustrates the relationship between strain and stress of the light-transmissive resin film (COP film) made of a cycloolefin-based resin, the buffer layer, and the LOCA layer. From FIG. 4, it can be seen that the COP film is hard but brittle, the LOCA layer is soft and tough, and the buffer layer is intermediate between the COP film and the LOCA layer in terms of softness and toughness. The COP film is said to be brittle because microvoids (defects) serve as sites to cause cracks. By inserting the buffer layer, the difference in stress intensity between the adjacent members is reduced. This renders the interface of the COP film viscoelastic, and thus the elongation property of the member adhering to the LOCA layer is secured.

In the touch sensor 15 and the touch panel 10 described above, the LOCA layer 60, which is the cured body of the liquid optically clear adhesive adhering to the glass plate 110 that is a solid member, adheres to the light-transmissive resin film 41. Although the curing compressibility ratio of the cured body of the liquid optically clear adhesive is 1% or greater, the influence of the residual stress of the cured body on the light-transmissive resin film 41 is relieved by the buffer layer 42. Further, the force exerted from the LOCA layer 60 to the light-transmissive resin film 41 due to a change in environmental temperature is relieved by the buffer layer 42. By these functions of the buffer layer 42, the occurrence of cracks in the light-transmissive resin film 41 made of a cycloolefin-based resin can be suppressed.

In addition, the buffer layer 44 relieves an influence exerted on the light-transmissive resin film 41 from the LOCA layer 50, which is the cured body of the liquid optically clear adhesive adhering to the cover glass 30 that is a solid member. Therefore, the touch sensor 15 including the buffer layer 44 and the light-transmissive resin film 41 relative to the LOCA layer 50 also exhibits an effect the same as or similar to the effect described above.

Note that even in the conventional case where, for example, a passivation layer and a transparent electrode are present between the LOCA layer and the COP film, spring constants of the passivation layer and the transparent electrode are not large. Thus, stress generated in the LOCA layer by thermal shock propagates through the passivation layer and the transparent electrode to the COP film. Consequently, cracks are conventionally generated in the COP film even when the passivation layer and the transparent electrode are present. Even when the passivation layer is present, providing the buffer layers 42, 44 between the LOCA layer and the passivation layer can dissipate stress between the LOCA layer and the passivation layer by the buffer layers 42, 44 and thereby suppress the occurrence of cracks in the COP film due to thermal shock.

(3-2)

As illustrated in FIG. 3, the buffer layers 42, 44 of the touch sensor 15 are configured to have, at 25° C., a Young's modulus greater than that of the LOCA layers 50, 60 formed of the cured body of the LOCA and less than that of the light-transmissive resin film 41. Consequently, the stress generated in the cured body of the LOCA and transferred to the light-transmissive resin film 41 can be effectively decreased by the buffer layers 42, 44.

(3-3)

When the buffer layers 42, 44 of the touch sensor 15 are made of a light-transmissive acrylic adhesive and contains a urethane, a polyfunctional acrylate, an isocyanate, and a bisphenol, the adhesion and strength of the buffer layers 42, 44 can be improved by cross-linking, and sufficient buffering performance can be obtained.

(4) Modified Examples (4-1) Modified Example 1A

Figure 7:
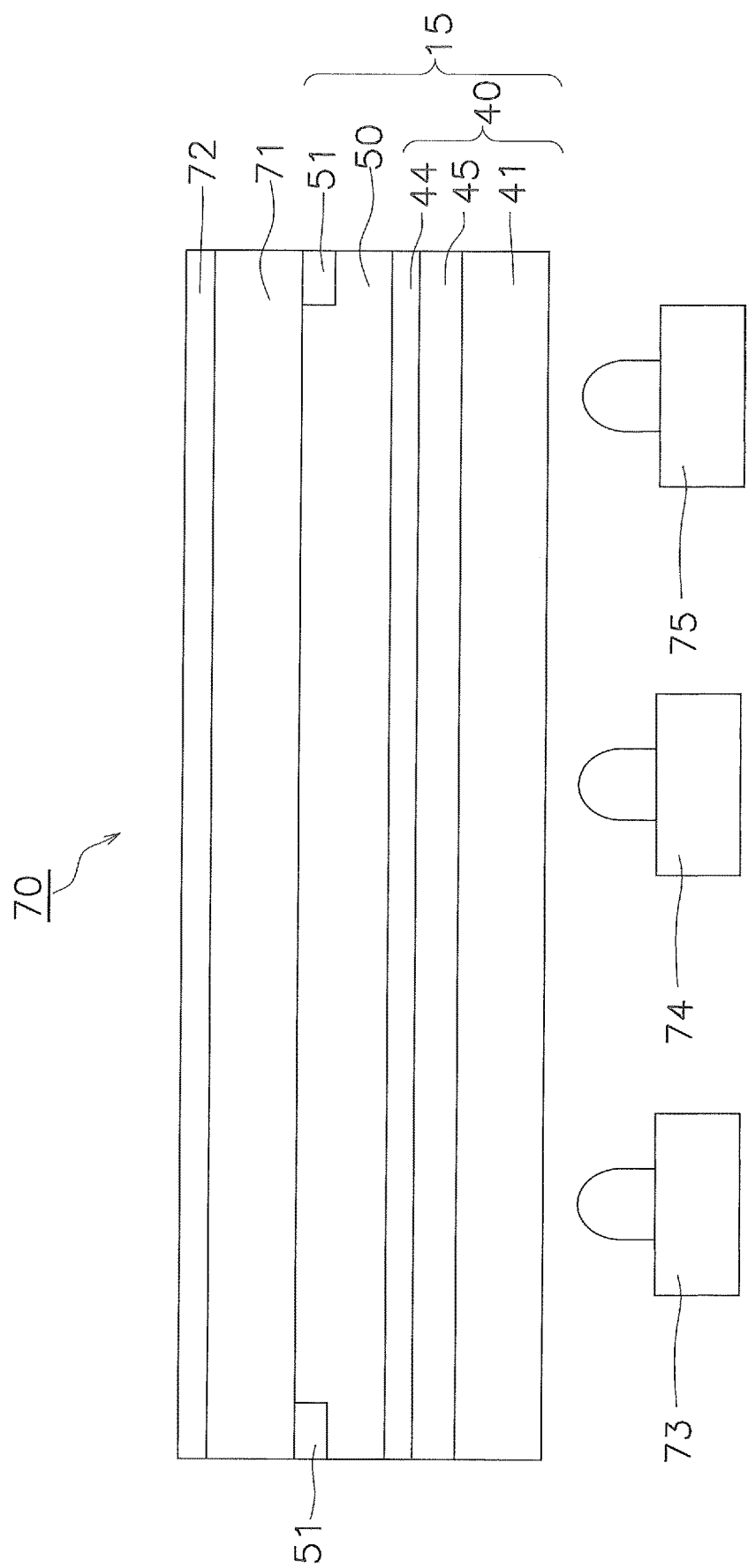
FIG. 7 is a schematic cross-sectional view illustrating an example of the configuration of an input device according to a modified example.

In the first embodiment described above, the touch panel 10 in which the touch sensor 15 and the display panel 100 are combined has been described. However, the touch sensor 15 can be used for applications other than the touch panel 10. For example, as illustrated in FIG. 7, an input device 70 is constituted by applying the touch sensor 15 to a structure in which a decorative sheet 72 adheres to a light-transmissive resin plate 71 and combining the touch sensor 15 with light emitting diodes (LEDs) 73, 74, 75. The touch sensor 15 of the input device 70 includes the LOCA layer 50 and the sensor body 40. In the input device 70 configured in this way as well, the occurrence of cracks generated by thermal shock in the light-transmissive resin film 41 made of a cycloolefin-based resin can be suppressed by the buffer layer 44. Note that in FIG. 7, components denoted by the same reference numerals as those in FIG. 2 are components the same as or similar to those illustrated in FIG. 2.

(4-2) Modified Example 1B

In the first embodiment described above, a case where the sensor body 40 includes only one light-transmissive resin film 41 adhering by the LOCA layer 60 has been described. However, a plurality of light-transmissive resin films adhering by LOCA layers may be disposed side by side, or a plurality of light-transmissive resin films may be provided layered. For example, the lower first light-transmissive COP film may be caused to adhere to the display panel by a LOCA layer, and the upper second light-transmissive COP film may be caused to adhere to the cover glass by a LOCA layer.

(4-3) Modified Example 1C

In the first embodiment described above, a case where the LOCA layer 50 is provided in the sensor body 40 has been described. However, the present invention can also be applied to a touch sensor in which the LOCA layer 50 is omitted. When the LOCA layer 50 is omitted, the buffer layer 44 is also omitted.

Second Embodiment (5) Overall Configuration

In the touch panel 10 according to the first embodiment, a case where the buffer layer 44 is provided between the LOCA layer 50 and the light-transmissive resin film 41 has been described. However, the location where the buffer layer is provided is not limited to between the LOCA layer and the light-transmissive resin film.

Figure 8:
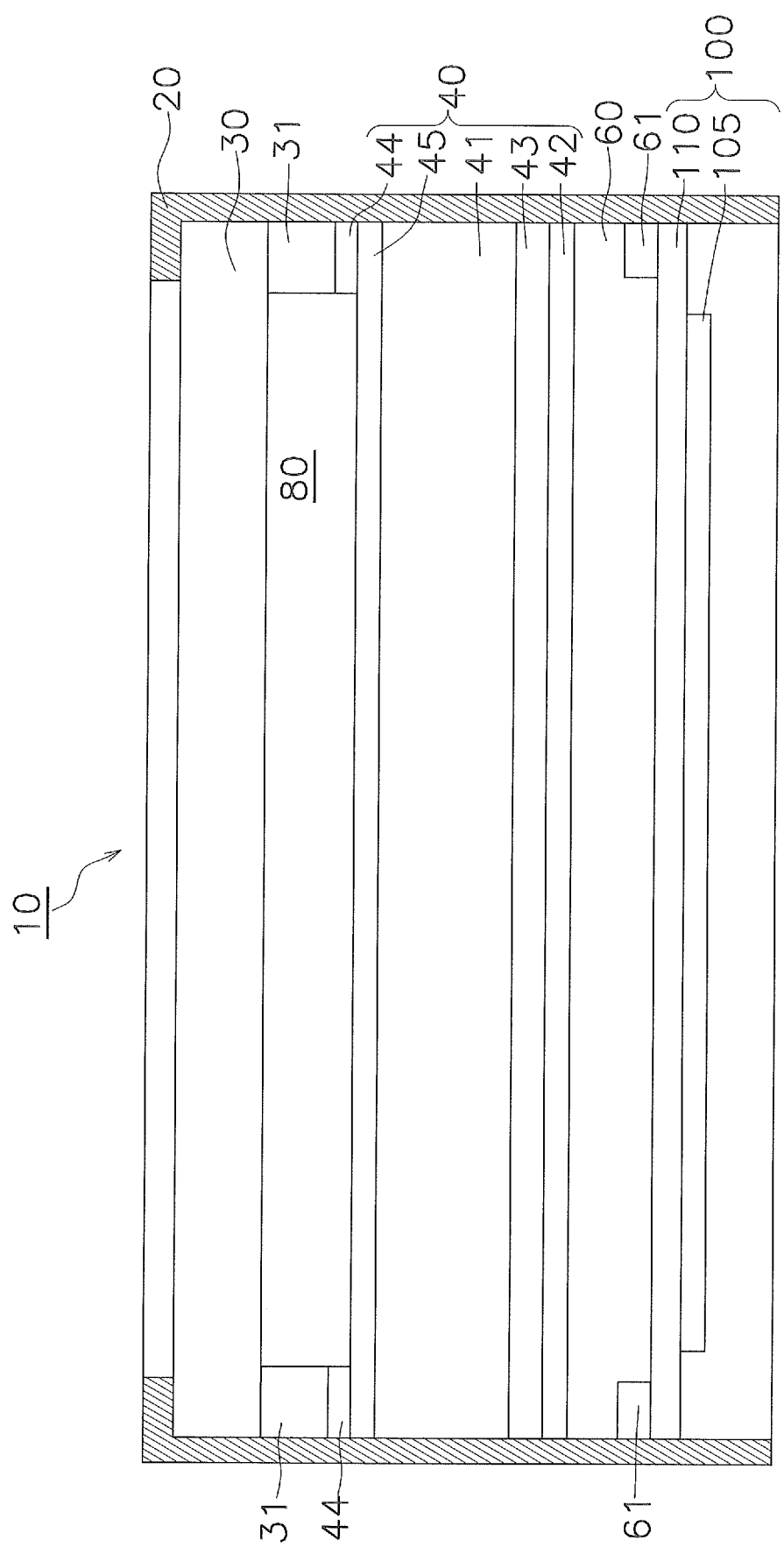
FIG. 8 is a schematic cross-sectional view illustrating an example of the configuration of a touch panel according to a second embodiment.

In the touch panel 10 according to a second embodiment illustrated in FIG. 8, the buffer layer 44 is provided between the shielding layer 31 and the light-transmissive resin film 41. A case where the touch panel 10 of the first embodiment and the touch panel 10 of the second embodiment have the same layered structure between the sensor body 40 and the display panel 100 will be described. Consequently, for the touch panel 10 of the second embodiment, a detailed description of the layered structure between the sensor body 40 and the display panel 100 will be omitted.

As illustrated in FIG. 8, in the touch panel 10 of the second embodiment, an LOCA layer 80 is formed in a region surrounded by the shielding layer 31. A curing compressibility ratio of a cured body of an LOCA contained in the LOCA layer 80 is less than 1%.

The shielding layer 31 is also an adhesive with which the cover glass 30 and the sensor body 40 are caused to adhere to each other. The curing compressibility ratio of the shielding layer 31 is 1% or greater. In addition, the linear expansion coefficient of the shielding layer 31 is greater than the linear expansion coefficient of the light-transmissive resin film 41 made of a cycloolefin-based resin. Therefore, the influence of the residual stress of the shielding layer 31 on the light-transmissive resin film 41 is relieved by the buffer layer 44. Further, the force exerted from the shielding layer 31 to the light-transmissive resin film 41 due to a change in environmental temperature is relieved by the buffer layer 44. The occurrence of cracks in the light-transmissive resin film 41 made of a cycloolefin-based resin can be suppressed by these functions of the buffer layer 44.

(6) Detailed Configuration (6-1) LOCA Layer 80

The LOCA layer 80 has an area different from that of the LOCA layer 50 and has a curing compressibility ratio of less than 1%. The LOCA layer 80 is, for example, formed and cured in the same manner as the LOCA layer 50. The thickness of the LOCA layer 80 is, for example, from 1 mm to 2 mm.

(6-2) Shielding Layer 31

The shielding layer 31 is, for example, an acrylic adhesive, a silicone adhesive, a urethane adhesive, or an epoxy adhesive. As described above, the shielding layer 31 is an adhesive having a curing compressibility ratio of 1% or greater. Further, the linear expansion coefficient of the shielding layer 31 is greater than the linear expansion coefficient of the light-transmissive resin film 41 made of a cycloolefin-based resin. However, the shielding layer 31 is opaque and does not transmit light. The thickness of the shielding layer 31 is, for example, from 1 mm to 2 mm.

(6-3) Buffer Layer 44

The same material as that of the buffer layer 44 of the first embodiment can also be applied to the buffer layer 44 of the second embodiment. In this case, the buffer layer 44 of the second embodiment differs from the buffer layer 44 of the first embodiment in that the location where the buffer layer 44 is provided is between the shielding layer 31 and the light-transmissive resin film 41. However, the buffer layer 44 of the second embodiment can be configured in the same manner as the buffer layer 44 of the first embodiment in other respects, for example, in terms of the material. However, the buffer layer 44 of the second embodiment need not have translucency and may have light-blocking properties. The Young's modulus of the buffer layer 44 is preferably set less than the Young's modulus of the light-transmissive resin film 41. Additionally, the Young's modulus of the buffer layer 44 is preferably set greater than the Young's modulus of the shielding layer 31.

(7) Features (7-1)

As shown in the graph of FIG. 4, the influence of the force exerted from the shielding layer to the light-transmissive resin film due to a change in environmental temperature was evaluated by a thermal shock test, in which a first state of exposure to air at -40° C. for four minutes and a second state of exposure to air at 100° C. for four minutes were alternately repeated.

Samples obtained by curing and causing to adhere a shielding layer having a thickness of 2 mm and an area of 140 cm² (0.7 cm×200 cm) to a glass plate, and samples in which a buffer layer having a thickness of 30 μm was disposed between the same shielding layer and the same light-transmissive resin film were compared.

After 278 cycles, a sample in which a crack developed in the light-transmissive resin film was found in the former, but no sample in which a crack developed was found in the latter.

In the touch sensor 15 and the touch panel 10 described above, the shielding layer 31 including a cured body of an adhesive adhering to the cover glass 30 that is a solid member adheres to the light-transmissive resin film 41. Although the curing compressibility ratio of the shielding layer 31 is 1% or greater, the influence of the residual stress of the cured body on the light-transmissive resin film 41 is relieved by the buffer layer 42. Further, the force exerted from the shielding layer 31 to the light-transmissive resin film 41 due to a change in environmental temperature is relieved by the buffer layer 44. The occurrence of cracks in the light-transmissive resin film 41 made of a cycloolefin-based resin can be suppressed by these functions of the buffer layer 44.

Note that even when the passivation layer and the electrode are present between the shielding layer and the buffer layer, providing the buffer layer 44 between the shielding layer and the passivation layer can dissipate stress between the shielding layer and the passivation layer by the buffer layer 44 and thereby suppress the occurrence of cracks in the COP film due to thermal shock.

(7-2)

When the buffer layer 44 of the touch sensor 15 is configured to have, at 25° C., a Young's modulus greater than that of the shielding layer 31 and less than that of the light-transmissive resin film 41, the stress generated in the shielding layer 31 and transferred to the light-transmissive resin film 41 can be effectively decreased by the buffer layer 44.

(8) Modified Examples (8-1) Modified Example 2A

In the second embodiment described above, a case where the buffer layer 44 is disposed only between the shielding layer 31 and the light-transmissive resin film 41 has been described. However, the buffer layer 44 may be disposed between the shielding layer 31 and the light-transmissive resin film 41 and between the LOCA layer 80 and the light-transmissive resin film 41. When the buffer layer 44 is disposed between the LOCA layer 80 and the light-transmissive resin film 41 in this way, the curing compressibility ratio of the LOCA layer 80 may be 1% or greater, and the linear expansion coefficient of the LOCA layer 80 may be greater than the linear expansion coefficient of the light-transmissive resin film 41 made of a cycloolefin-based resin.

(8-2) Modified Example 2B

In the second embodiment described above, a case where the LOCA layer 60 is provided in the sensor body 40 in the touch panel 10 that is an input device has been described. However, the present invention can also be applied to a touch panel in which the LOCA layer 60 is omitted. When the LOCA layer 60 is omitted, the buffer layer 42 is also omitted.

For example, an adhesive may be applied to the aforementioned display panel 100 in a frame-like shape in a planar view to cause the display panel 100 and the sensor body 40 to adhere to each other with a cured body of the frame-like adhesive. In this case, the adhesive has a curing compressibility ratio of 1% or greater, and the linear expansion coefficient of the cured body is greater than the linear expansion coefficient of the light-transmissive resin film made of a cycloolefin-based resin. In such a configuration, a frame-like buffer layer 42 is provided between the cured body of the frame-like adhesive and the sensor body 40.

(8-3) Modified Example 2C

In the second embodiment described above, the touch panel 10 in which the touch sensor 15 and the display panel 100 are combined has been described. However, the touch sensor 15 can be used for applications other than the touch panel 10.

For example, the present invention can also be applied to an input device in which the display panel 100 and the LOCA layer 80 are omitted and that includes a solid member corresponding to the cover glass 30, an adhesive corresponding to the shielding layer 31, the buffer layer 44, and the sensor body 40. Note that when the cover glass 30 and the sensor body 40 are caused to adhere to each other with a simple frame-like adhesive (for example, a transparent adhesive) not having the shielding function of the shielding layer 31, a frame-like buffer layer 44 may be provided between the sensor body 40 and a cured body of the frame-like adhesive surrounding the periphery of the screen 105. In this case, the adhesive has a curing compressibility ratio of 1% or greater, and the linear expansion coefficient of the cured body is greater than the linear expansion coefficient of the light-transmissive resin film made of a cycloolefin-based resin. In such a configuration, the cover glass 30 and the sensor body 40 need not adhere to each other in the area surrounded by the cured body of the frame-like adhesive.

For example, the touch sensor may be a resistive touch sensor adhering to a supporting body that is a solid member with an adhesive having a curing compressibility ratio of 1% or greater. In this case, the linear expansion coefficient of the adhesive is greater than the linear expansion coefficient of the resin film, made of a cycloolefin-based resin, of the touch sensor.

Although embodiments of the present invention have been described above, the present invention is not limited to the aforementioned embodiments, and various modifications can be made without departing from the scope of the invention. In particular, the plurality of embodiments and modified examples described herein can be combined randomly with one another as necessary.

In the embodiments described above, at the time of forming the LOCA layer, the dam is formed at the edge portion of the cover glass or the glass plate; however, the dam may be formed at the edge portion of the sensor body.

In addition, in the embodiments described above, a film may be provided between the LOCA layer and the buffer layer. In the second embodiment, a film may be provided between the adhesive such as the shielding layer and the buffer layer. Examples of the material of the film include an acrylic resin and a urethane resin.

REFERENCE CHARACTER LIST

10 Touch panel
15 Touch sensor
30 Cover glass (example of solid member)
31 Shielding layer (example of adhesive)
40 Sensor body
31 Light-transmissive resin film
42, 44 Buffer layer
50, 60 Liquid optically clear adhesive layer (LOCA layer)
100 Display panel
105 Screen
110 Glass plate (example of solid member)

The invention claimed is:

1. A touch sensor, comprising:
a solid member;
an adhesive layer adhering to the solid member and including a cured body of an adhesive having a curing compressibility ratio of 1% or greater; and
a sensor body having a film shape, the sensor body firmly adhering to the solid member by the adhesive layer and configured to detect a position of a contact point on a display area, wherein
the sensor body includes:
a light-transmissive resin film substantially made of a cycloolefin-based resin and having a linear expansion coefficient less than that of the cured body;
a buffer layer provided between the light-transmissive resin film and the adhesive layer to relieve stress transferred from the adhesive layer to the light-transmissive resin film; and
the buffer layer has viscoelasticity at 25° C.

2. The touch sensor according to claim 1, wherein
the solid member has translucency; and
the adhesive layer is a liquid optically clear adhesive layer including a cured body of a liquid optically clear adhesive having a linear expansion coefficient greater than that of the light-transmissive resin film and a curing compressibility ratio of 1% or greater.

3. The touch sensor according to claim 1, wherein the buffer layer has, at 25° C., a Young's modulus greater than that of the adhesive layer and less than that of the light-transmissive resin film.

4. The touch sensor according to claim 1, wherein the buffer layer is substantially made of a light-transmissive acrylic adhesive.

5. The touch sensor according to claim 4, wherein the buffer layer contains a urethane, a polyfunctional acrylate, an isocyanate, and a bisphenol.

6. An input device, comprising:
a solid member; and
a touch sensor adhering to the solid member, wherein the touch sensor includes:
an adhesive layer adhering to the solid member and including a cured body of an adhesive having a curing compressibility ratio of 1% or greater; and
a sensor body having a film shape and firmly adhering to the solid member by the adhesive layer,
the sensor body includes:
a light-transmissive resin film substantially made of a cycloolefin-based resin and having a linear expansion coefficient less than that of the cured body; and
a buffer layer provided between the light-transmissive resin film and the adhesive layer to relieve stress transferred from the adhesive layer to the light-transmissive resin film, and
the buffer layer has viscoelasticity at 25° C.

* * * * *